United States Patent [19]  [11]  4,360,448
Li et al.  [45]  Nov. 23, 1982

[54] WATER IN OIL EMULSIONS USEFUL IN LIQUID MEMBRANE

[75] Inventors: Norman N. Li, Edison; Robert P. Cahn, Milburn; Adam L. Shrier, Montclair, all of N.J.

[73] Assignee: Exxon Research and Engineering Co., Florham Park, N.J.

[21] Appl. No.: 404,716

[22] Filed: Oct. 9, 1973

Related U.S. Application Data

[60] Division of Ser. No. 174,990, Aug. 25, 1971, Pat. No. 3,779,907, and a continuation-in-part of Ser. No. 28,094, Apr. 13, 1970, Pat. No. 3,617,546.

[51] Int. Cl.$^3$ .............................................. B01J 13/00
[52] U.S. Cl. ..................................... 252/309; 210/643
[58] Field of Search ...................... 252/309, 188.3 R; 210/643

[56] References Cited

U.S. PATENT DOCUMENTS 2,299,693  10/1942  Green ..................... 252/188.3 R X
3,057,804  10/1962  Berkeley et al. ..................... 252/118
3,714,062  1/1973  Askew et al. ................... 252/309 X
3,719,590  3/1973  Li et al.

*Primary Examiner*—Richard D. Lovering
*Attorney, Agent, or Firm*—R. J. Baran; Joseph J. Allocca

[57] ABSTRACT

This invention relates to a process for the removal of dissolved species from aqueous solutions, which comprises contacting said aqueous solution with an emulsion, said emulsion comprising an exterior phase which is characterized as being immiscible with said aqueous solution and yet permeable to said dissolved species, and an interior phase which contains a reactant capable of converting said dissolved species to a nonpermeable form. The dissolved species permeate the exterior phase, into the interior phase where they are converted into nonpermeable forms and thus retained in the interior phase of said emulsion. The aqueous solution, depleted in said dissolved species, is separated from said emulsion and the emulsion cycled for reuse. In one preferred embodiment said dissolved species are ions, and an ion exchange compound is incorporated in the exterior phase of the emulsion, to promote the permeation of said ions through the exterior phase.

5 Claims, No Drawings

WATER IN OIL EMULSIONS USEFUL IN LIQUID MEMBRANE

CROSS REFERENCE TO RELATED APPLICATIONS

This is a division of application Ser. No. 174,990 filed Aug. 25, 1971, now U.S. Pat. No. 3,779,907 issued Dec. 18, 1973, and a continuation-in-part of U.S. application Ser. No. 28,094 filed on Apr. 13, 1970, now U.S. Pat. No. 3,617,546 issued Nov. 2, 1971 in the names of Norman N. Li, Robert P. Cahn and Adam L. Shrier.

BACKGROUND OF THE INVENTION

This invention relates to a process for the removal of dissolved species (solute) from aqueous solutions, which comprises contacting said aqueous solution with an emulsion, said emulsion comprising an exterior phase which is characterized as being immiscible with said aqueous solution and yet permeable to said dissolved species, and an interior phase which contains a reactant capable of converting said dissolved species to a nonpermeable form. The dissolved species permeate the exterior phase, into the interior phase where they are converted into non-permeable forms and thus retained in the interior phase of said emulsion. The aqueous solution, depleted in said dissolved species, is separated from said emulsion and the emulsion cycled for reuse. In one preferred embodiment said dissolved species are ions, and an ion exchange compound is incorporated in the exterior phase of the emulsion, to promote the permeation of said ions through the exterior phase.

Liquid surfactant membranes, as disclosed in U.S. Pat. No. 3,454,489, may be utilized to separate dissolved compounds from their aqueous solutions. The process described therein is based on diffusion through the liquid surfactant membrane, and thus the limit of separation was reached when the concentration of the dissolved compounds on both sides of the membrane became equal.

It has now been unexpectedly discovered that a dissolved species may be efficiently removed from an aqueous solution by contacting said aqueous solution with an emulsion, said emulsion comprising an exterior phase which is immiscible with said aqueous solution and permeable to said dissolved species, and an interior phase comprising a reactant which is capable of converting said dissolved species to a form in which it is no longer permeable. The dissolved species in its nonpermeable form is thus trapped in the interior phase and the concentration gradient of the permeable form of said compound between the aqueous solution and the interior phase is maintained. The concentration gradient acts to drive the dissolved compound efficiently through the exterior phase of the emulsion into the interior phase. By use of this technique small volumes of emulsion may be used to treat large volumes of aqueous solution efficiently. Thus the instant process, although not limited thereto, is useful in water pollution control, wherein large bodies of water must be treated to remove small amounts of dissolved impurities, e.g., the dissolved species.

The exterior phase of the emulsion will comprise one or more surfactants, a solvent, if needed, and/or various other additives, as further elucidated below. The exterior phase is designed to be immiscible with said aqueous solution, and to form an effective emulsion, must also be immiscible with the interior phase and with the reactant in the interior phase. The exterior phase acts as a liquid membrane through which selected, dissolved species may permeate into the interior phase where they are converted to nonpermeable forms.

The dissolved species which may be removed by the instant process include inorganic and organic, neutral and ionic, acidic and basic compounds. In each specific case the exterior phase of the emulsion must be chosen so that the dissolved species is at least slightly soluble therein. It will be obvious to the skilled artisan which exterior phase may be used for any specific dissolved species. The exterior phase may be specially adapted to solubilize any dissolved species by use of a solubilizing additive. For example, hydrocarbon soluble ion exchange compound can be dissolved in a hydrocarbon exterior phase to promote the solubility of ionic species therein.

The choice of reactant will be made in view of two factors. It must be capable of converting the dissolved species, e.g., compound, which has permeated into the interior phase, into a nonpermeable form, thus trapping said dissolved compound and keeping the concentration of said compound low in the interior phase. Also, said reactant must itself remain trapped in the interior phase. Usually the reactant will be soluble in the interior phase, but the use of insoluble reactants, i.e., solid adsorbents, or slightly soluble reagents like lime in an aqueous interior phase is feasible.

In a typical example of how the instant process may be utilized, a water immiscible solvent containing a surfactant soluble therein, is mixed with an aqueous solution containing a reactant under high shear conditions to form a stable water in oil emulsion. Said emulsion is then contacted with an aqueous stream containing a dissolved species by any of various methods, i.e., agitating a mixture of the emulsion and the aqueous stream together in a batch process; cocurrent contacting in a continuous flow reactor; countercurrent contacting by bubbling said aqueous stream through a column containing said emulsion, or vice versa. In all of these procedures a difference in density between said aqueous stream and said emulsion is maintained in order to permit separation of the emulsion and the aqueous stream after contact.

During contact, the dissolved species present in the aqueous stream permeates through the exterior phase of the water in oil emulsion, into the interior phase, which comprises the reactant-containing solution, wherein said dissolved species reacts with said reactant and is converted into a nonpermeable form (thus keeping the concentration of the permeable form low in the interior phase). If the reactant were not present, the dissolved species would continue to permeate into the interior phase until the concentration of said dissolved species in the interior phase was equal to its concentration in the aqueous stream. At this point further permeation into the interior phase would cease.

By providing a reactant capable of converting said permeable species into a nonpermeable form, in the interior phase, the concentration of the permeable form of the dissolved species in the interior phase is held below the concentration in the aqueous stream. The dissolved species is thus continuously forced into the interior phase by the resulting concentration gradient.

The various dissolved species which may be separated from their aqueous solutions include weakly basic compounds, e.g., NH$_3$, various amines, and other nitrogen-containing organic compounds. In general these are reacted in the interior phase with a strong acid, e.g., $H_2SO_4$, HCl, $HNO_3$, which neutralizes said basic compounds and converts them into an ionic, i.e., nonpermeable form. By maintaining a pH difference between the aqueous solution and the interior phase, the concentration of the permeable, un-ionized form of said compounds can be maintained high in the aqueous stream and low in the interior phase.

Weakly acidic compounds, e.g., $CO_2$, $SO_2$, acetic acid, $H_2S$, phenol, HCN, citric acid and many other organic acids are reacted in the interior phase with a strong base, e.g., NaOH, $K_2CO_3$, KOH and are converted to ionic, i.e., nonpermeable forms.

Various dissolved species may be precipitated in the interior phase, and thus converted to a nonpermeable form. Examples include the removal of $H_2S$ by reaction with copper ions, and the removal of HCN by reaction with silver ions, said ions being dissolved in the interior phase.

Ionic species may also be separated from their aqueous solutions by use of the instant process, the only proviso being that said ionic species be at least somewhat soluble in the water immiscible exterior phase of the emulsion.

For example, ions of tin, iron and copper, being slightly soluble in aromatic and olefinic solvents, may be separated from aqueous solution, by utilizing a water in oil emulsion comprising an aromatic or olefinic solvent as the exterior phase.

Generally, various solubilizing additives, i.e., compounds which are soluble in the water immiscible exterior phase and are capable of interaction with ions to solubilize them, are added for the promotion of the permeation of ions through the exterior phase.

If it is desirable to remove cations from an aqueous solution, a compound selected from the group consisting of sulfonic acids, organo phosphoric acids, and carboxylic acids, may be incorporated in the exterior phase. It should be noted that compounds chosen from this group may also function as surfactants. However, best results, i.e. balancing the emulsion stability with the rate of transfer of ions across the membrane, are obtained when a nonionic surfactant as hereinafter described is combined with one of these compounds.

In general, when removing cations from an aqueous solution, the water immiscible exterior phase will comprise a non-ionic surfactant and a compound selected from the group consisting of polyfunctional sulfonic acids, polyfunctional carboxylic acids, and polyfunctional organo phosphoric acids said polyfunctional compounds are known in the art as ion exchange compounds. Said ion exchange compounds generally have a molecular weight of from 200 to 10,000 and will have a ratio of carbon atoms to functional group of greater then 5.

Examples of ion exchange compounds which are useful for transfer of ions through the membrane include: sulfonated styrene copolymers, petroleum sulfonic acids, naphthenic acids, sulfonated phenol formaldehyde copolymers, styrene-maleic acid copolymers, styrene-acrylic acid copolymers, etc.

When it is desirable to remove anions, then amines may be incorporated in the exterior phase. Amines may, likewise, function as surfactants, but as previously noted, the best balance of emulsion stability and ion transfer, requires a non-ionic surfactant and an amine.

The useful amines are also known in the art as ion exchange compounds and will contain more than 4 carbon atoms per nitrogen atom.

Useful amines include styrene copolymers containing pendant quaternary ammonium groups, including derivatives of trimethylamine or dimethylethanolamine.

A preferred group of amines are compounds of the general formula

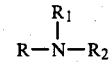

wherein R and $R_1$ are independently selected from the group consisting of hydrogen, $C_1$ to $C_{20}$ alkyl, $C_6$ to $C_{20}$ aryl and $C_7$ to $C_{20}$ alkaryl radicals and $R_2$ is selected from the group consisting of $C_6$ to $C_{30}$ alkyl, $C_6$ to $C_{20}$ aryl and $C_7$ to $C_{20}$ alkaryl radicals. Specific examples within the above definition include di-n-decylamine, dilaurylamine, methyldioctylamine, tri-n-octylamine, tri-iso-octylamine, tribenzylamine, tri-p-butylbenzyl amine, tricaprylamine, 1-amino-1,1,3,3,5,5,7,7,9,9-decamethyl decane (Primene JM-T), didodec enyl-n-butylamine, trilaurylamine, etc.

Most preferred compounds, within the above definition are Primene JM-T and Amberlite LA-2 a N-lauryl trialkyl methylamine, both available from Rohm and Haas Co.

Various polyamine derivatives are useful within the scope of the instant invention. The preferred polyamine derivatives are those having the general formula:

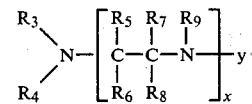

wherein $R_3$, $R_4$, [$R_5$, $R_6$, $R_7$, $R_8$, $R_9$ and y] are chosen from the group consisting of hydrogen, $C_1$ to $C_{20}$ alkyl, $C_6$ to $C_{20}$ aryl, $C_7$ to $C_{20}$ alkaryl radicals and substituted derivatives thereof; and x is an integer of from 1 to 100. More preferably $R_5$, $R_6$, $R_7$, $R_8$, and $R_9$ are hydrogen, and x varies from 3 to 20.

The substituted derivatives previously mentioned are preferably selected from the group consisting of oxygen, nitrogen, sulfur, phosphorous, and halogen containing derivatives.

In the most preferred polyamine derivative, $R_3$ and $R_4$ together form an alkyl succinic radical having the general formula

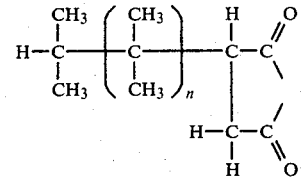

wherein n varies from 10 to 60, x varies from 3 to 10, $R_5$, $R_6$, $R_7$, $R_8$ and $R_9$ are hydrogen, and y is selected from the group consisting of hydrogen and oxygen-containing hydrocarbyl radicals having up to 10 carbons e.g. acetyl, etc.

Once the ions permeate into the interior phase, they may be converted into a nonpermeable form by precipitation, complexing, etc. with a reactant maintained in the interior phase. Examples of such conversions include precipitation of Ag, Cu, Cd, and Hg ions with sulfide ions; precipitation of Ca ions with phosphate ions and vice versa; reduction of nitrate ions with ferrous ions and complexing of nitrogen oxide with ferric sulfate. Any of the well known ion complexing agents such as ethylene diamine tetra acetic acid may be utilized as reactants.

An interesting variation of the above process for separating ions from aqueous solution involves maintenance of a pH differential between the interior phase and the aqueous solution, whereby the pH at the aqueous solution-exterior phase interface promotes the solubility of the ions in the ion exchange compound containing exterior phase, and the pH at the exterior phase-interior phase interface promotes the desorption of the ions from the exterior phase and subsequent solubilizing in the interior phase.

The process of this invention contemplates the separation of dissolved compounds from aqueous solution, and thus [in order to maintain the emulsion as a phase separate from said aqueous solution] it is necessary that the emulsion be of the water in oil type. The surfactants utilized will be of the oil soluble type. In general the surfactants must have low solubility in both the aqueous solution and the interior phase. Also, the surfactant preferably promotes the permeability of the dissolved species of interest through the membrane. Specific surfactants which may be used include anionic, cationic, or nonionic surfactants.

The following anionic surfactants are useful for the process of the instant invention:

Carboxylic acids, including fatty acids, rosin acids, tall oil acids, branched alkanoic acids, etc.

Sulfuric acid esters, including alcohol sulfates, olefin sulfates, etc.

Alkane and alkylaryl sulphonates, including alkyl benzene sulfonates, alkyl naphthalene sulphonates, etc.

Phosphoric acid esters, including mono and dialkyl phosphates.

The following cationic surfactants are useful for the process of the instant invention:

Quaternary amine salts.

Nonionic surfactants are the preferred surfactant type for the practice of the process of the instant invention. A useful group of nonionic surfactants include the polyethenoxy-ether derivatives of alkyl phenols, alkylmercaptans, and alcohols, e.g. sorbitol, pentaerythritol, etc.

Particular nonionic surfactants for use in the instant process include compounds having the general formula

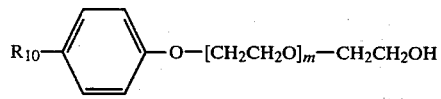

wherein $R_{10}$ may be $C_8H_{17}$, $C_9H_{19}$, or $C_{10}H_{21}$ and m is an integer varying from 1.5 to 8.

The most preferred nonionic surfactant is Span 80, a fatty acid ester of anhydro sorbitol condensed with ethylene oxide.

Short-chain fluorocarbons with polar groups are frequently sufficiently soluble in hydrocarbon oils to function as surfactants. Long-chain fluorocarbons attached to a hydrocarbon chain of sufficient length are soluble in hydrocarbon oils.

Silicone oils differ broadly in their chemical structure and surface-active properties. Those of sufficiently low molecular weight to be soluble in the hydrocarbon solvent and which contain only $CH_3$ groups attached to silicon in the $(Si-O)_n$ skeleton can be expected to be surface-active.

Since the number of surfactants is extremely large, it is not intended to burden this application with numerous examples. The following publications may be referred to for further examples: Surface Chemistry by Lloyd I. Osipow, Reinhold Publishing Company, New York (1962) chapter 8 and Surface Activity, Moilliet et al, Van Nost and Company, Inc. (1961) Part III.

Generally the exterior phase of the emulsion comprises a water immiscible solvent, as well as one or more surfactants. The solvent may be chosen from the class consisting of hydrocarbons, halogenated hydrocarbons, ethers, higher oxygenated compounds such as alcohols, ketones, acids and esters.

The various additives which have been previously mentioned as useful for transporting ions across the membrane may function as the water immiscible solvent. In particular the various amines previously mentioned are useful solvents for the formation of water in oil emulsions.

The solvent, of course, must be liquid at the conditions at which the instant process is operated, and also must be capable, in conjunction with the surfactant, of forming a stable water in oil emulsion with the interior phase. Conveniently the interior phase is aqueous but any solvent which forms and maintains the interior phase of a stable emulsion with the selected surfactant-solvent exterior phase mixture may be used.

The interior phase exists as droplets surrounded by the solvent-surfactant exterior phase. When the water in oil emulsion is contacted with the aqueous solution, the exterior phase acts as a liquid membrane which allows certain dissolved species to permeate into the interior phase where a reactant contained therein converts them to a form which cannot permeate back through the "liquid membrane".

The water in oil emulsion must be stable so that the exterior phase coating the droplets of the interior phase does not rupture and thus allow mixing of the components of the interior phase with the aqueous solution.

It should be noted that a variation of the above process is possible wherein the aqueous solution comprises the interior phase of the water in oil emulsion, which is then contacted with a solution containing a reactant for the dissolved species. This variation although possible is not economically favored for treating pollution, where large volumes of aqueous solution would have to be emulsified, but may be of interest where small streams must be treated with large volumes of reactant.

The emulsion used in the instant process may be prepared by various methods. Weight ratios of from 0.1 to 1.8, preferably of from 0.5 to 1.0, of a reactant solution is mixed with a water immiscible solvent in which is dissolved at least about 0.0001% by weight, preferably from about 0.01% by weight to 10% by weight, most preferably from 0.1% by weight to 5% by weight of an oil soluble surfactant. The reactant solution is preferably aqueous with a concentration that is dependent primarily on the solubility of the reagent in the aqueous solution. Preferably the aqueous solution is saturated with the reactant or may be a slurry containing undissolved reactant. The above mixture is emulsified by use of high speed stirrers, colloid mills, valve homogenizers, ultrasonic generators or mixing jets.

When an ion exchange compound is incorporated in the exterior phase of the water in oil emulsion, it may comprise from about 1 to 99.9% by weight of said exterior phase. Preferably said ion exchange compound will comprise from about 4 to about 40% by weight of said exterior phase.

A typical water in oil emulsion, for use in separating ions from aqueous solutions, will thus comprise from 0.01 to 10% by weight nonionic surfactant, from 5 to 75% by weight ion exchange compound, and from 25 to 75% by weight of an aqueous solution containing a reactant for the aforesaid ion.

The emulsion is then contacted with an aqueous solution containing dissolved compounds, in a manner as previously described, whereby the dissolved compounds permeate through the "liquid membrane" exterior phase into the reagent-containing interior phase, wherein said dissolved compounds are converted to nonpermeable forms. The emulsion is then separated from the aqueous solution, which is now depleted in the dissolved compounds, and optionally the emulsion is cycled to a recovery area, where it may be regenerated. For example, the emulsion may be broken, the surfactants and solvent reused for making fresh emulsion, and the reactant regenerated for reuse.

zone was maintained at a temperature of 25° C. and a pressure of 1 atmosphere. The surfactant used was Span 80, a commercial name for sorbitan monooleate with a viscosity of 1000 cps at 25° C., in an amount of 2% by weight. The mixture of surfactant, sodium hydroxide solution and surfactant solvent (a high molecular weight isoparaffin having a carbon number range of from about 25 to about 35) was emulsified and then contacted with the phenol-containing aqueous feed. After the emulsion and the aqueous solution were mixed at a rate of 100 rpm for about 50 minutes, the emulsion and the aqueous solution were separated and analyzed. The results and additional details of the experiments are included in Table I. The aqueous solution was analyzed by UV spectrography method for phenol concentration and by titration with acid for caustic concentration.

The Table indicates that in Run 1 where no sodium hydroxide was added, a high phenol concentration remained after 43 minutes of agitation. On the other hand, in Run 2 where 0.4 wt. % of caustic was used, at the end of 19 minutes only 3 parts per million of phenol remained. In Run 3 where the caustic concentration was increased slightly to 0.5 wt. %, phenol was reduced from 1000 to 33 parts per million in just 53 minutes.

It should be noted that the Na content of the waste water rose very slowly, indicating very little permeation of Na-ion from the "inside" of the emulsion to the outside waste water stream.

TABLE I

EXPERIMENTAL PHENOL REMOVAL FROM WASTE STREAMS

| | Run No. | | |
|---|---|---|---|
| | 1 | 2 | 3 |
| Aqueous Phenol Solution | | | |
| CC | 250 | 250 | 250 |
| Phenol, ppm | 1,000 | 200 | 1,000 |
| Emulsion | | | |
| Exterior Phase | Isoparaffin | Isoparaffin | Isoparaffin |
| Volume of Exterior Phase, CC | 200 | 200 | 200 |
| Surfactant | 2% Span 80 | 2% Span 80 | 2% Span 80 |
| Interior Aqueous Phase, CC | 100 | 96.8 | 97 |
| Caustic Conc., wt. % | 0 | 0.4 | 0.5 |

| Run Data | Time, Min. | Phenol, in Aqueous Solution ppm | % Removed | Time, Min. | Phenol, in Aqueous Solution ppm | % Removed | Time, Min. | Phenol, in Aqueous Solution ppm | % Removed |
|---|---|---|---|---|---|---|---|---|---|
| | 0 | 990 | 0 | 0 | 200 | 0 | 0 | 1,000 | 0 |
| | 2 | 730 | 26 | 1 | 83 | 59 | 2 | 652 | 35 |
| | 5 | 667 | 33 | 2 | 60 | 70 | 5 | 288 | 71 |
| | 8 | 615 | 38 | 3 | 36 | 82 | 18 | 41 | 96 |
| | 28 | 606 | 39 | 5 | 17 | 92 | 38 | 44 | 96 |
| | 43 | 612 | 38 | 19 | 3 | 98 | 53 | 33 | 97 |
| | | | | | No NaOH in Aqueous Phase | | | Na in Final Aq. Phase = 43 ppm | |

The above process may be operated at any temperature at which the emulsion and the aqueous solution are fluid and stable; conveniently, ambient temperature is used. The pressure must likewise be sufficient to maintain the fluidity of various phases; conveniently, ambient pressures are used.

The following are specific embodiments of the instant process. The above process is general in scope, and thus there is no intention of being limited to said specific embodiments.

EXAMPLE 1

In the following runs, phenol was removed from an aqueous solution. The solution was introduced into a separation zone which was provided with a mixer. The

EXAMPLE 2

In this example phosphoric acid and mono sodium phosphate were removed from aqueous solutions. The aqueous solution of phosphate was introduced into a separation zone which was provided with a mixer. The zone was maintained at ambient temperature and pressure. The surfactant used was Span 80. The mixture of emulsion containing surfactant, calcium compounds, surfactant solvents, high molecular weight amines with molecular weight below 1,000, and the phosphate-containing aqueous feed was stirred at a rate of 100 rpm for about 50 minutes. The results and additional details of the experiments are included in Table II. The feed recovered was analyzed by colorimetric method for phosphate concentration and by titration method for chloride concentration when calcium chloride was used.

The example is representative of using an ion exchange compound to promote the permeation of ionic compounds through the exterior emulsion phase, and the subsequent conversion to a nonpermeable form by precipitation with reagent.

solution contained 219.3 ppm of $NaNO_3$ in water. After the feed and the emulsion were contacted for 2 minutes, the concentration of $NaNO_3$ in the feed dropped to 35.64 ppm. The concentration only increased slightly to 41.12 ppm after continuous mixing for 53 minutes more, thus indicating that there was very little membrane rupture during the mixing period.

A blank run was made in which 282 gm of liquid

TABLE II
EXPERIMENTAL PHOSPHATE REMOVAL FROM WASTE WATER

| | Run No. 1 | Run No. 2 | Run No. 3 | Run No. 4 | Run No. 5 |
|---|---|---|---|---|---|
| (1) Aqueous Feed (gm) | 107 | (1) to (7) are same as Run 1 | 500 | (1) to (8) are same as Run 3 | (1) to (7) are same as Run 3 |
| (2) Phosphoric Compound | $NaH_2PO_4.H_2O$ | | $NaH_2PO_4.H_2O + H_3PO_4$ (1:1 by wt.) | | |
| (3) Emulsion Used (gm) | 97 | | 281 | | |
| (4) Surfactant Solvent | 49% JMT Primene + 49% Polyamine derivative[a] | | 95% Isoparaffin (see Example 1) Amberlite LA-2[b] + 2% Polyamine derivative[a] | | |
| (5) Wt. % Organic Surfactant Solution in Emulsion | 66.9 | | 67 | | |
| (6) Surfactant | 2% Span 80 | | 1% Span 80 | | |
| (7) Wt. % Aqueous Phase In Emulsion | 33.1 | | 33 | | |
| (8) Reagents (wt. % in Aq. Phase) | 6% $CaCl_2$ + 6% $NH_4OH$(0.1N) | None | 15% $CaCl_2$ + 5% $Ca(OH)_2$ | | None |
| (9) Run Data | | | | | |
| Time Min. | $PO_4^{-3}$ (Wt. %) | $Cl^-$ (Wt. %) | $PO_4^{-3}$ (Wt. %) | $PO_4^{-3}$ (Wt. %) | $Cl^{-1}$ (Wt. %) | $PO_4^{-3}$ (Wt. %) | $PO_4^{-3}$ (Wt. %) |
| Feed 0 | 0.565 | 0 | 0.565 | 0.273 | 0 | 0.273 | — |
| 2 | 0.265 | 0.084 | 0.338 | 0.123 | 0.036 | 0.133 | 0.204 |
| 5 | 0.200 | 0.0168 | 0.314 | 0.073 | 0.065 | 0.120 | 0.205 |
| 18 | 0.050 | 0.0110 | 0.316 | 0.016 | — | 0.075 | 0.206 |
| 44 | | | 0.294 | 0.004 | 0.103 | 0.018 | 0.204 |

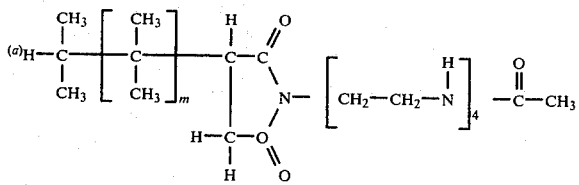

[a] m is an integer of about 40, giving said polyamine derivative a molecular weight of about 2,000.

[b] Amberlite LA-2 is a trade name for high molecular weight (mol.wt.353-39) primary and secondary amines which are oil-soluble but not water-soluble, have anion exchange resin properties; possess a neutralization equivalent of 360-380, an ion exchange capacity of 2.7 meq./gm., a viscosity of 18 cps at 25° C. and a density of 0.83 gm./ml.

The Table indicates that in Runs 2 and 5 where there were no calcium compounds inside the droplets, a high phosphate concentration remained after 44 minutes of agitation. Although the membranes themselves did remove some phosphate, such process is highly inefficient and therefore not economical. On the other hand in Run 1 where 6.0 wt. % of calcium chloride was used, at the end of 18 minutes only 0.05% of phosphate remained. In the other experiments where 15% $CaCl_2$ and 5% $Ca(OH)_2$ were used, phosphate was reduced from 0.273% to 0.004% in 44 minutes in Run 3 and from 0.273% to 0.018% in 44 minutes in Run 4.

It should be noted that the Cl content of the waste water rose very slowly, indicating slow permeation of Cl-ion from the "inside" of the emulsion to the outside waste water stream.

EXAMPLE 3—Separation of nitrate 279 gm of liquid membrane emulsion are mixed with 465 gm of an aqueous nitrate solution at 200 RPM. The emulsion was made by emulsifying 100 gm reagent solution composed of 50% $H_2SO_4$, 20% $FeSO_4$, and 30% $H_2O$ in 200 gm surfactant solution (2% Span 80 and 98% isoparaffin [see Example 1]). The aqueous membrane emulsion was mixed with 492 gm. feed. The emulsion, containing no reagent, was made by emulsifying 100 gm pure water in 200 gm of the same surfactant solution. The same aqueous solution was used in the run. After the aqueous nitrate solution was continuously mixed with the emulsion for 68 minutes the concentration of $NaNO_3$ was only reduced from 219.3 ppm to 205.6 ppm, indicating the removal of the nitrate in the absence of reagent was insignificant.

EXAMPLE 4—Separation of Ammonia

Aqueous solution: Water containing $NH_4OH$ (690 ppm)
Surfactant solution = 2% Span 80 + 98% isoparaffin (see Example 1) 200 gm.
Reagent solution = 2% HCl in water 100 gm.

Mixed 237 gm. of the water in oil emulsion with 500 gm feed at 250 RPM. Samples were taken from time to time from the aqueous solution.

| Mixing Time (Min.) | NH$_4$OH Concentration in Aqueous solution (ppm) |
| --- | --- |
| 0 | 690 |
| 2 | 250 |
| 5 | 130 |
| 18 | <30 |
| 38 | <30 |
| 53 | <30 |

Total Time of mixing = 53 minutes.

What is claimed is:

1. A water-in-oil emulsion, useful in liquid membrane processes, comprising a nonionic oil soluble surfactant, present at from 0.01 to 10 weight % of said emulsion, an oil soluble ion exchange compound in the exterior phase, said oil soluble ion exchange compound being present at from 5 to 75 weight % of said emulsion and selected from compounds having the general formula:

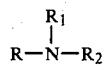

wherein R and $R_1$ are independently selected from the group consisting of hydrogen, $C_1$ to $C_{20}$ alkyl, $C_6$ to $C_{20}$ aryl and $C_7$ to $C_{20}$ alkaryl radicals and $R_2$ is selected from the group consisting of $C_6$ to $C_{30}$ alkyl, $C_6$ to $C_{20}$ aryl and $C_7$ to $C_{20}$ alkaryl radicals; and

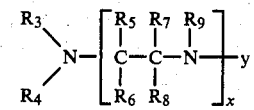

wherein $R_3$, $R_4$, $R_5$, $R_6$, $R_7$, $R_8$, $R_9$ and y are independently selected from the group consisting of hydrogen, $C_1$ to $C_{20}$ alkyl, $C_6$ to $C_{20}$ aryl, $C_7$ to $C_{20}$ alkaryl radicals and substituted derivatives thereof, and x is an integer of from 1 to 100.

2. The emulsion of claim 1 wherein $R_5$, $R_6$, $R_7$, $R_8$ and $R_9$ are hydrogen, x varies from 3 to 20 and said substituted derivatives are chosen from the group consisting of oxygen, nitrogen, sulfur, phosphorus and halogen containing derivatives.

3. The emulsion of claim 2, wherein $R_3$ and $R_4$ together form an alkyl succinic radical having the general formula

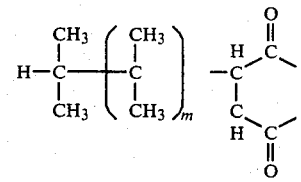

wherein m is an integer varying from 10 to 60, x varies from 3 to 10, and y is selected from the group consisting of hydrogen and oxygen containing hydrocarbyl radicals having up to 10 carbons.

4. The emulsion of claim 1, wherein said aqueous interior phase comprises a calcium salt which is at least partially soluble therein.

5. The emulsion of claim 4 wherein said salt is CaCl$_2$.

* * * * *